United States Patent [19]

Moriki et al.

[11] Patent Number: 5,005,654
[45] Date of Patent: Apr. 9, 1991

[54] HIGH TORQUE HYDRAULIC SHOE BOLT WRENCH

[75] Inventors: Yasumitsu Moriki, Tokyo; Hirotomo Numakura, Kawasaki, both of Japan

[73] Assignee: Maruma Jyusharyo Kabushiki Kaisha, Tokyo, Japan

[21] Appl. No.: 455,934

[22] Filed: Dec. 18, 1989

Related U.S. Application Data

[63] Continuation of Ser. No. 306,880, Feb. 3, 1989, abandoned.

[30] Foreign Application Priority Data

Sep. 28, 1988 [JP] Japan .................. 63-243690

[51] Int. Cl.$^5$ ............................................. B25B 21/00
[52] U.S. Cl. .................. 173/12; 81/57.22; 81/470; 81/57.25; 60/424; 192/150
[58] Field of Search .................. 81/469, 470, 473, 475, 81/57.22, 57.41, 57.25, 57.4; 173/2, 5, 12, 42, 43; 192/146, 147, 150; 60/424, 462; 91/514, 517, 519

[56] References Cited

U.S. PATENT DOCUMENTS

| | | | |
|---|---|---|---|
| 3,108,507 | 10/1963 | Quarve | 81/57.25 |
| 3,142,210 | 7/1964 | Rodgers | 81/57.25 |
| 3,507,173 | 4/1970 | Wallace | 81/470 |
| 3,529,513 | 9/1970 | Amtsberg | 173/12 |
| 3,586,115 | 6/1971 | Amtsberg | 173/12 |
| 3,686,983 | 8/1972 | Flagge | 173/12 |
| 4,300,641 | 11/1981 | Kinkel | 81/57.22 |
| 4,403,663 | 9/1983 | Janssen | 173/12 |
| 4,432,257 | 2/1984 | Yamamoto | 81/57.41 |
| 4,484,871 | 11/1984 | Adman | 81/470 |

Primary Examiner—Roscoe V. Parker
Attorney, Agent, or Firm—Emmanuel J. Lobato; Robert E. Burns

[57] ABSTRACT

A hydraulic shoe bolt wrench used to mount and remove shoe bolts which secure shoes to a track chain. The apparatus comprises a vertical cylinder stood upright on a frame moving on a work table, a main frame secured to a piston rod of the vertical cylinder, a wrench socket driving shaft vertically projected below the main frame, a low speed high torque motor and a reduction gear provided on the driving shaft. Pressure oil is supplied to the high speed low torque motor and high pressure oil is supplied to the low speed high torque motor. Switching of the high speed low torque motor to the low speed high torque motor is carried out by a pressure switch disposed in a low pressure hydraulic circuit.

11 Claims, 3 Drawing Sheets

HIGH TORQUE HYDRAULIC SHOE BOLT WRENCH

This is a continuation, of application Ser. No. 07-306,880, filed Feb. 3, 1989 and now abandoned.

BACKGROUND OF THE INVENTION

1. Field of the Invention

The present invention relates to a hydraulic shoe bolt wrench used to mount and remove shoe bolts by which shoes are secured to a track chain consituting a shoe track of a construction machinery.

2. Prior Art

With the recent larger-size of construction machineries, shoe bolts also have a large diameter and a fastening torque is set to a high level. For example, in the class of 100 ton, the diameter of bolts is set to 36 mm and the fastening torque is set to $310 \pm 30$ kg f.m. Therefore, the hydraulic wrench as previously disclosed in Japanese Patent Application Laid-Open No. 255333/1985 by the present applicant is not sufficient to meet the requirement.

In order to attain an initial high speed turning work by a single high torque hydraulic motor as disclosed in the aforementioned conventional apparatus, a hydraulic pump for supplying a large capacity of pressure oil and a larger motor for driving the pump are required, and in addition, even if it is rotated at high speeds, instantaneous stop thereof is impossible due to the inertia, and therefore, it is difficult to further rotate it by the inertia force after reaching to a defined torque value to obtain an accurate defined fastening torque.

Further, a hydraulic wrench has been proposed to increase the fastening torque. In this apparatus, a cylindrical ratchet for connection and disconnection is interposed between a wrench socket and a low-speed high torque motor, and it is rotated in the outer periphery of the cylindrical ratchet by a stroke of a hydraulic cylinder to obtain a predetermined fastening torque or an additional fastening.

However, the apparatus is designed so that a cylindrical clutch is rotated by the linear motion of a fixed cylinder, and therefore, a rotation transmission torque is varied by the angle of rotation of the cylindrical ratchet.

Furthermore, normally, in this system, the fastening torque is set by oil pressure to the hydraulic cylinder. Therefore, the torque value of the actually fastened bolt is different from the set value.

Moreover, in this apparatus, the succeeding operation cannot be made unless the hydraulic cylinder is returned to its original position. Therefore, there involves disadvantages that the workability is poor, and that frictional noises of the ratchet occur during the returning stroke of the cylinder.

SUMMARY OF THE INVENTION

It is an object of the present invention to provide a high torque hydraulic wrench in which after a weak fastening force is generated by a high speed hydraulic motor with respect to a wrench driving shaft into a set torque, the high speed hyraulic motor is automatically switched to a high torque low speed motor to transmit a defined torque, and even an instantaneous stop, a desired defined torque is obtained.

It is another object of the present invention to provide a high torque shoe bolt wrench which can respond to the case where a predetermined additional fastening angle is required after a bolt fastening force bas attained a defined torque.

The apparatus according to the present invention comprising a vertical cylinder stood upright on a frame moving on a work table of a shoe track, a main frame secured and supported on a piston rod of said vertical cylinder through an outer tube which rotates about an axis, a wrench socket driving shaft vertically projected below said main frame, a low speed high torque motor and a reduction gear provided on the aixs of said driving shaft through a jaw clutch mechanism, said driving shaft having one lower clutch constituting said clutch mechanism and being always connected to a high speed low torque motor, said reduction gear having an upper clutch with a shift mechanism slidably provided on an output shaft thereof, said main frame being provided with an operating handle for adjusting the rotational direction and rotational speed of each of said hydraulic motors, whereby pressure oil having a relatively low set pressure of a hydraulic circuit is supplied to said high speed low torque motor, high pressure oil is supplied to said low speed high torque motor and driven, and switching from said high speed low torque motor to said low speed high torque motor is carried out by a pressure switch disposed in a low pressure hydraulic circuit.

It is noted in the present invention that the shift means may be of an electromagnetic type but a single acting type cylinder may also be employed.

Furthermore, pressure oil may be supplied to a lifting vertical cylinder of a main frame through an oil port extending through an axis of a piston rod.

Moreover, transmission means between the high speed low torque motor and the wrench driving shaft can be suitably selected but a belt pulley will suffice.

It is to be noted of course that a hydraulic circuit for supplying pressure oil to the apparatus of the present invention to cause motors, cylinders and the like to perform their predetermined operation is not limited to the embodiment shown in FIG. 3.

Furthermore, in the present invention, where an additional turning is required during the fastening, an electric angle detection mechanism is actuated at the time when a defined torque value reached to provide an extra turning through a predetermined angle.

BRIEF DESCRIPTION OF THE DRAWINGS

FIG. 1 is sectional view in an enlarged scale showing essential parts of the apparatus.

DETAILED DESCRIPTION OF THE INVENTION

Figure 1:
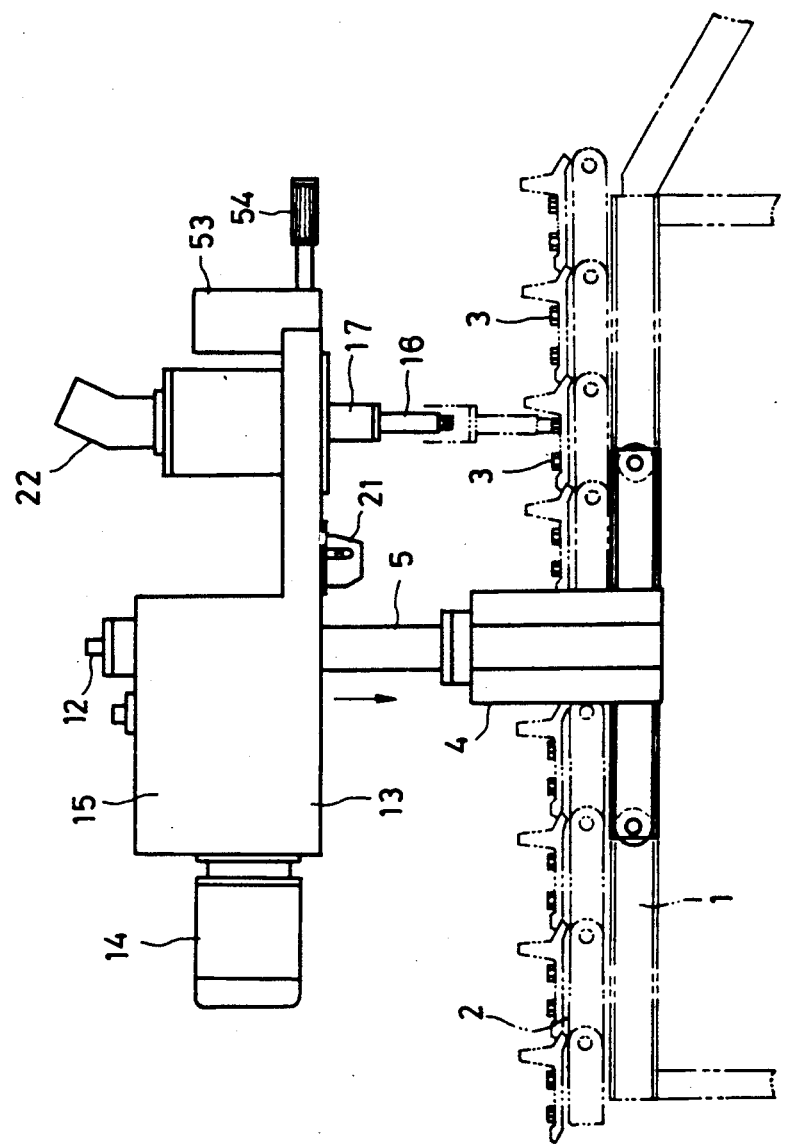
FIG. 1 is a side view of apparatus according to the present invention.
Figure 2:
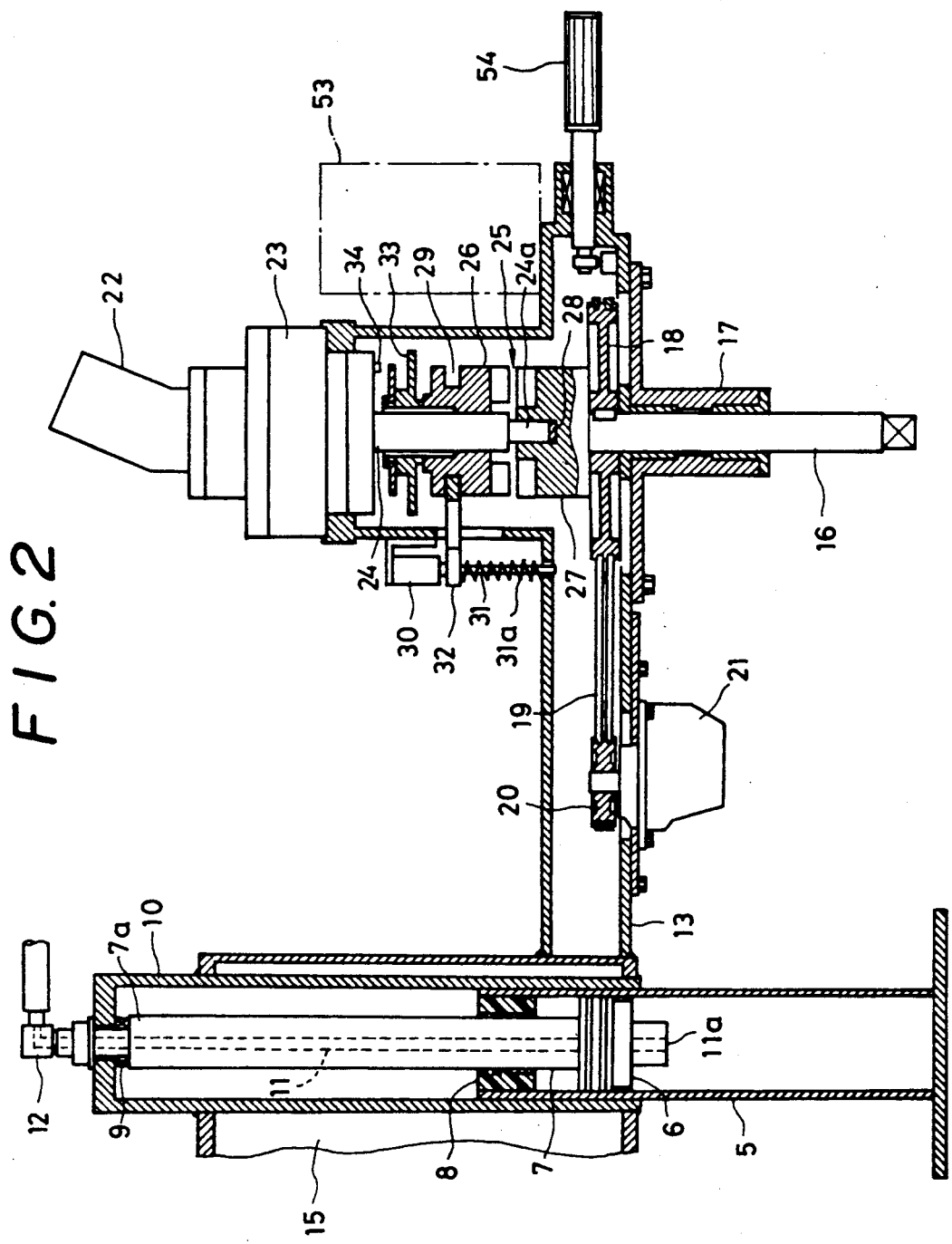

Reference numeral 1 designates a work table provided with a roller conveyor, 2 a shoe track and 3 a mounting bolt.

Reference numeral 4 designates a gate type movable frame, 5 a hydraulic cylinder vertically mounted thereon, 6 a piston, and 7 a piston rod which extends through a cyliner cover 8 and is slidably moved.

A cap-like outer tube 10 is mounted on an extreme end 7a of the piston rod through a thrust bearing 9, the outer tube receiving therein the cylinder 5.

Reference numeral 11 designates an oil port which extends through an axis of the rod 7, the upper end of which has a hose connected thereto through a swivel joint 12, the lower end thereof being opened at 11a within the cylinder.

Accordingly, the outer tube 10 is moved up and down together with the piston and rotates around the cylinder.

Reference numeral 13 designates a main frame fixedly mounted in the outer periphery of the outer tube, 14 a motor, and 15 an oil tank housing therein an oil pump.

Reference numeral 16 designates a drive shaft with a wrench socket mounted thereon, the drive shaft being supported on a sleeve 17 and having a lower jaw 27 constituting a pulley 18 and a clutch 25.

Reference numeral 19 designates a belt, 20 a pulley, and 21 a high speed low torque hydraulic motor.

Reference numeral 22 designates a low speed high torque hydraulic motor, 23 a reduction gear, and 24 an output shaft. Reference numeral 25 designates a jaw clutch mechanism composed of an upper jaw 26 and a lower jaw 27.

The upper jaw 26 is slidably moved with respect to the output shaft, for example, by actuation of a cylinder, and connected to the lower jaw 27.

An extreme end 24a of the output shaft is fitted into the lower jaw 27, the extreme end of which is supported through a thrust plate 28.

A fork 32 engaged with a circumferential groove 29 of the upper jaw clutch 26 is mounted on an extended output shaft 31 of the cylinder 30, and the clutch 25 is turned ON and OFF by the actuation of the cylinder 30. Reference numeral 31a designates a return spring, 33 a slit disc and 34 a photosensor which is used to set a rotational angle in case of additional fastening or additional turning.

Figure 3:
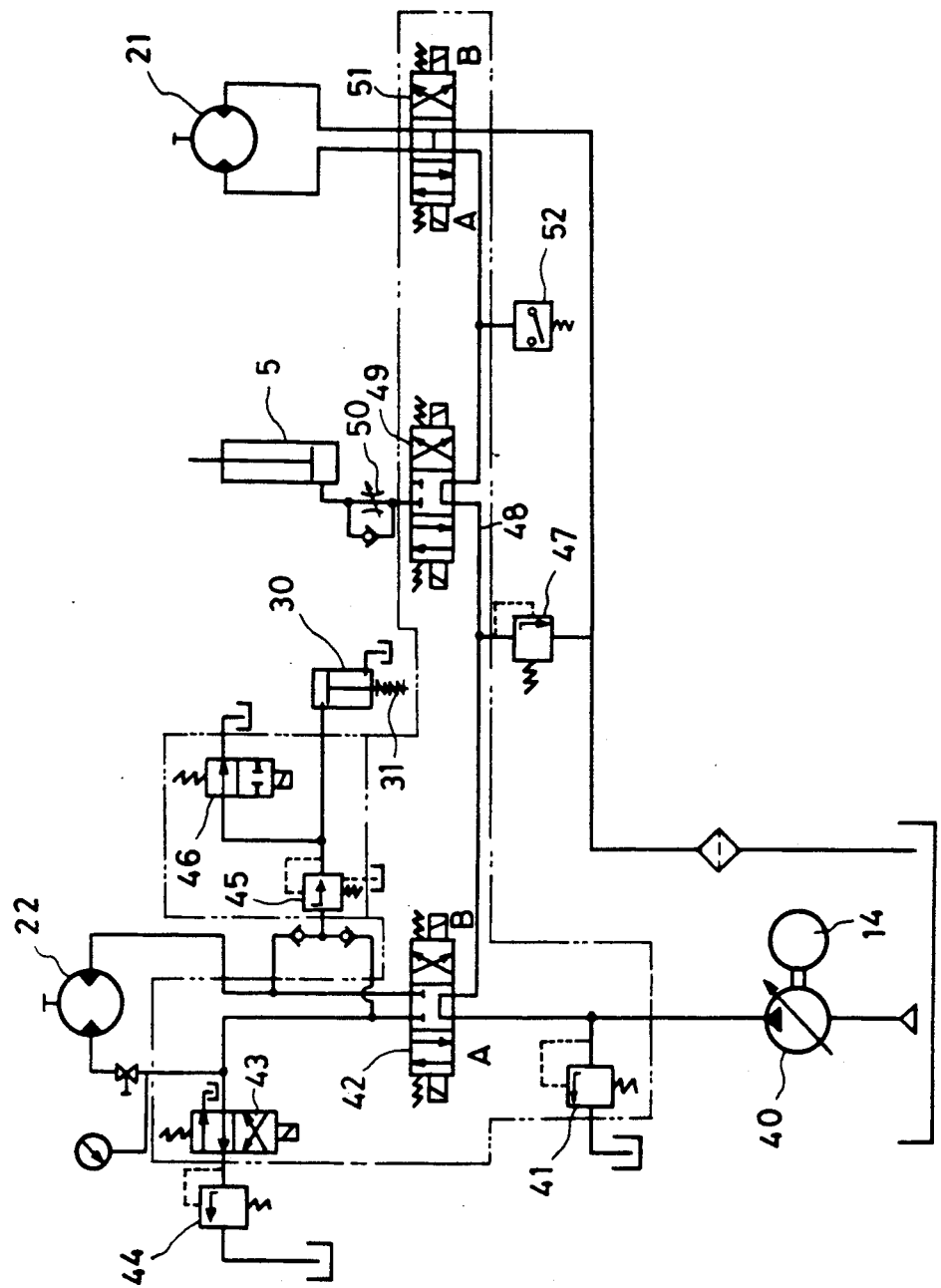
FIG. 3 is a systematic view of a hydraulic circuit.

In FIG. 3, reference numeral 40 designates an oil pump, and 41 a relief valve, which is set to 350 kg/cm$^2$, for example.

Reference numeral 42 designates an electromagnetic switching valve, 43 a switching valve actuated in case of additional turning, and 44 a relief valve for adjusting pressure corresponding to a bolt fastening torque.

Reference numeral 45 designates a reduction valve which acts irrespective of the rotational direction of the high torque motor 22 to supply reduced pressure oil to the clutch switching cylinder 30.

Reference numeral 46 designates an electromagnetic valve for supplying and stopping pressure oil.

Reference numeral 47 designates a reduction valve which supplies pressure oil, for example, of 23 kg/cm$^2$, to a low pressure line 48.

Reference numeral 49 designates an electromagnetic switching valve for supplying or discharging pressure oil from the cylinder 5 to move upwardly the main frame 13, and 50 a throttle valve which adjusts the descending speed of the main frame.

Reference numeral 51 designates an electromagnetic valve for switching the rotational direction of the low torque motor 21, and 52 a pressure switch for setting pressure to be switched from the low torque motor 21 to the high torque motor 22.

Reference numeral 53 designates a control box, and 54 an operating handle for adjusting the rotational direction and rotational speed of the low and high torque motors and turning the main frame itself in a horizontal direction.

The function of the apparatus will be described hereinafter.

(A) Removal of the shoe bolt

The socket wrench is fitted into the shoe bolt head by upward and downward movement of the cylinder 5 by way of the operating handle 54 and a switch (not shown) on a control panel.

Since the apparatus of the present invention is designed to be always started from the low torque motor side, the pressure switch is immediately responded to the tightly fastened bolt.

Accordingly, when the operating handle is turned in a predetermined direction, the pressure switch 52 is actuated to switch the electromagnetic valve 42 in a predetermined direction, and at the same time, the electromagnetic valve 46 is actuated to switch the port, and therefore, the pressure oil is supplied to the cylinder 30 to cause the clutch 25 to be engaged.

Thereby, the turning force of the low speed high torque motor 22 is transmitted to the wrench socket to rotate the bolt head.

After the bolt has been rotated, the motor is once stopped by the operation of the handle, and the hydraulic circuit is made to assume the FIG. 3 state. When restarted, the high speed torque motor 21 is rotated to rotate the bolt at a high speed.

(B) Fastening of the shoe bolt

The shoe bolt is first rotated at a high speed by the low pressure torque motor 21 and fastened. As the fastening torque increases, the pressure switch 52 is actuated to switch the low pressure torque motor 21 to the high torque motor 22, and the clutch 25 is engaged and the bolt is fastened with a defined torque corresponding to the set pressure of the relief valve 44.

Where the additional turning is required, the switching valve 43 is switched from the control panel to render the relief valve 44 inoperative.

At the same time when the high torque motor starts, pulses from the slit disc 33 and photo-sensor 34 are counted and after the motor has been rotated through a predetermined angle, it stops.

It is noted that the additional turning angle detection means may comprises well-known means such as a disc cam and a limit switch.

According to the apparatus of the present invention, in the case of fastening and removing the shoe bolt, the low torque motor is switched to the high torque motor and vice versa to effect operation. Therefore, the efficient operation can be accomplished and in addition, upward and downward movement of the main frame is carried out by the lifting cylinder, and therefore, the overall height of the apparatus can be designed to be low.

Moreover, the setting of the switching torque of the high and low torque motors and the switching of the clutch can be made simply and positively, and the operation is simple.

What is claimed is:

1. A high torque hydraulic shoe bolt wrench comprising a vertical cylinder stood upright on a frame moving on work table of a shoe track, a main frame secured and supported on a piston rod of said vertical cylinder through an outer tube which rotates about an axis, a wrench socket driving shaft vertically projected below said main frame, a low speed high torque motor and a reduction gear provided on the axis of said driving shaft through a jaw clutch mechanism, said driving shaft having one lower clutch constituting said clutch mechanism and being always connected to a high speed low torque motor, said reduction gear having an upper clutch with a shift mechanism slidably provided on an output shaft thereof, said main frame being provided with an operating handle for adjusting the rotational direction and rotational speed of each of said hydraulic motors, characterized in that pressure oil having a relatively low set pressure of a hydraulic circuit is supplied to said high speed low torque motor, high pressure oil is supplied to said low speed high torque motor and driven, and switching from said high speed low torque motor to said low speed high torque motor is carried out by a pressure switch disposed in a low pressure hydraulic circuit.

2. The high torque hydraulic shoe bolt wrench according to claim 1, wherein the shift mechanism of the clutch comprises a single acting cylinder.

3. The high torque hydraulic shoe bolt wrench according to claim 1, wherein the connection between the high speed low torque motor and the wrench driving shaft comprises a belt pulley.

4. The high torque hydraulic shoe bolt wrench according to claim 1, further comprising an electric angle detector.

5. A high torque shoe bolt wrench comprising, a worktable, a shoe track supported on the worktable having shoes thereon and shoe bolts for fastening the shoes on the shoe track, a frame movable horizontally along the worktable, an upstanding hydraulic cylinder supported on said frame and having a piston reciprocable therein, a bolt-turning wrench mechanism supported on the hydraulic cylinder and movable upwardly to a raised position and downwardly to a lowered position above the worktable when the piston is reciprocably driven, said mechanism having a shoe bolt wrench comprising a rotatable wrench shaft driveable in opposite directions, the wrench shaft having thereon a wrench socket engageable with individual shoe bolts when disposed in registry therewith and said mechanism is in said lowered position, a high speed low-torque motor rotatable alternatively in opposite directions for driving the wrench shaft rotationally in opposite directions for fastening the shoe bolts in one direction and unfastening the shoe bolts by rotation in an opposite direction, a low speed high-torque motor rotatable for alternatively driving the wrench shaft in said opposite directions, means for initating driving of the wrench shaft by said low-torque motor, shift means for shifting driving of the wrench shaft from one motor to the other in dependence upon torque-resistance detected when the wrench socket is engaged with a shoe bolt, and detector means for detecting said torque-resistance for shifting driving of the wrench shaft from one motor to the other.

6. A high torque shoe bolt wrench according to claim 5, in which the low-torque motor and the high-torque motor are each a hydraulic motor, said bolt-turning wrench mechanism including a source of hydraulic pressure, a low pressure system in communication with said source for supplying low pressure hydraulic fluid to the high speed, low-torque motor and a high pressure system in communication with said source for supplying high pressure hydraulic fluid to the low speed, high-torque motor and means in the high pressure system for setting a fastening torque level to which the shoe bolts are fastened as a function of torque-resistance encountered by the wrench in fastening individual shoe bolts.

7. A high torque shoe bolt wrench according to claim 6, in which the last-mentioned means is pressure-responsive means for responding to the pressure level in the high pressure system.

8. A high torque shoe bolt wrench according to claim 7, in which said pressure-responsive means comprises a relief valve in the high pressure system for limiting the torque developed by the high torque motor applied to the wrench thereby limiting the torque applied to the individual shoe bolts.

9. A high torque shoe bolt wrench according to claim 5, in which said shift means for shifting driving of the wrench comprises a jaw clutch mechanism for coupling the high torque motor to the wrench shaft and means for selectively actuating the clutch mechanism.

10. A high torque shoe bolt wrench according to claim 5, further including means for determining the torque applied by the high torque motor.

11. A high torque shoe bolt wrench according to claim 10, in which the last-mentioned means comprises photoelectic counting means counting rotations of the clutch means.

* * * * *